United States Patent Office 3,505,334
Patented Apr. 7, 1970

3,505,334
PIPERAZINO-PHENYLETHANOL DERIVATIVES
Gilbert Regnier, Sceaux, Roger Canevari, La Haye-les-Roses, and Michael Laubie, Vaucresson, France, assignors to Science Union et Cie Societe Francaise de Recherche Medicale, Suresnes, France, a French society
No Drawing. Filed June 2, 1966, Ser. No. 554,658
Claims priority, application Great Britain, June 16, 1965, 25,449/65
Int. Cl. C07d 51/70
U.S. Cl. 260—268                                17 Claims

ABSTRACT OF THE DISCLOSURE

Piperazino phenylethanols of the formula

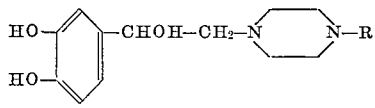

in which R represents lower-alkyl, phenyl, substituted phenyl, an aryl alkane group which may be hydroxy or methylene dioxy substituted, and wherein the alkylene chain may carry a secondary alcohol function, and a diarylalkane group, and therapeutically acceptable acid addition salts thereof. The compounds possess hypotensive, vasodilator, broncholytic, and muscle relaxant properties.

---

The present invention provides new derivatives of piperazinophenylethanols of the general Formula I:

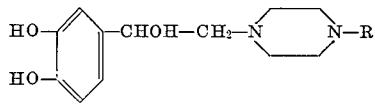

(I)

in which R represents:

a lower alkyl radical, up to 5 carbon atoms inclusive,
a phenyl ring, or a phenyl ring with substituents, e.g. lower-alkyl radicals of up to 5 carbon atoms, lower-alkoxy radicals of up to 5 carbon atoms, trifluoromethyl, and dimethylsulfamide,
an aryl alkane group of the general Formula II:

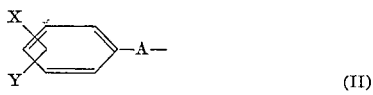

(II)

in which X and Y are the same and each is a hydrogen atom or a hydroxyl radical, or may together be a methylene dioxy group, and A represents a linear or branched alkylene chain containing 1 to 5 carbon atoms inclusive, and optionally a secondary alcohol function —CHOH—, and in the event where X and Y stand for hydrogen atoms, containing at least 2 carbon atoms, or a diaryl alkane group of the general Formula III:

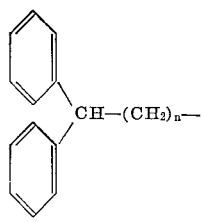

(III)

in which $n$ may have values from 0 to 3, inclusive.

The invention further provides a process for the preparation of new phenylethanol derivatives by reduction of a phenyl ketone of the general Formula IV:

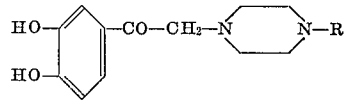

(IV)

in which R has the above indicated meanings, by means of hydrogen and a hydrogenation catalyst.

In the classical methods generally used, metals of group VIII, such as platinum or palladium, are employed either in powder form or thoroughly deposited on a support such as carbon black or alumina, and the reaction is generally carried out in polar solvents such, for example, as alcohols or acetic acid, which dissolve the starting phenyl aminoketones or their salts. The reduction is generally carried out under low hydrogen pressures and at a slightly elevated temperature, but the results obtained are often mediocre and poorly reproducible on a large scale and in any case the use of large quantities of such catalysts is rather expensive.

Such reductions can also be carried out by working with large quantities of Raney nickel as the catalyst, in polar solvents such, for example, as alcohols, but in this case, it is preferable to work under hydrogen pressures of 10 to 30 atmospheres. The objection to this method is that it is difficult, in view of the large quantities of catalyst used, to achieve a rapid and complete reduction and to recover the reduction product completely because of a significant absorption phenomenon onto the catalyst.

We have found that the method of preparation of these new derivatives can be considerably improved by using Raney nickel as the catalyst, provided one works in alkaline solution.

The advantage of this modification is that it does not prevent the use of large quantities of catalyst while at the same time wholly suppressing the absorption phenomenon attributable to the free phenolic groups of the molecule of the starting ketone. Furthermore, operating in alkaline solution, using water as the solvent, is very simple and allows the solubility of such compounds to be considerably increased. The hydrogenation process may be carried out at hydrogen pressures not exceeding 7 atmospheres and at ordinary temperature.

Finally, in the particular case of the new compounds which form the object of the invention and which are of poor solubility in acid solution, the fact that one works in an alkaline medium practically eliminates degradation phenomena.

The most satisfactory method of operating this hydrogenation procedure consists of dissolving the particular phenyl ketone in a dilute aqueous caustic soda or potassium hydroxyde solution and carrying out the hydrogenation in the presence of a quantity of Raney nickel at least equal to the quantity of ketone used, at a hydrogen pressure of 3 to 7 atmospheres and at ordinary temperature. The hydrogenation is generally very rapid and, after filtering off the catalyst, the reduction product is recovered by neutralising the alkaline solution by means of carbon dioxyde.

The new phenylethanol derivatives, which are weak bases generally slightly soluble in the usual solvents, can be purified by forming their addition salts with minerals or organic acids in polar solvents such as water or low molecular weight alcohols. Among the addition salts with mineral acids one may mention among others, the hydrochloride, hydrobromide, sulphate, phosphate, and methanesulphonate, and among those with organic acids, the acetate, propionate, maleate, fumarate, succinate, benzoate, tartrate, malate and oxalate.

These new compounds and their addition salts possess interesting pharmacological and therapeutic properties, particularly hypotensive, vasodilator, broncholytic and muscle relaxant properties, and may be used as medicaments for these purposes in conjunction with the appropriate pharmaceutical carriers.

The hypotensive activity was studied in the anesthetized dog, rabbit and rat. It was found that the new compounds, when administered intravenously at doses of 1 to 5 mg./kg., lower the blood pressure of animals from 30 to 90 mm. Hg. This lowering action is observed on the systolic as well as on the diastolic pressure. At the same time, the peripheral vascular resistance decreases. An adrenolytic activity is shown by the inhibition, frequently by the inversion, of the hypertensive effect of adrenaline and noradrenaline. The compounds also have an inhibiting action on the hypertension of central origin provoked by eserine. They do not influence the catecholamine content of tissues, nor the sympathic transmissions.

When injected intracenously at doses of 0.5 to 5 mg./kg. in rabbit, the new compounds produce an increase of the output of the paw perfused at constant pressure. This increase varies from 20 to 125% and the duration thereof is over 20 minutes, showing an important peripheral vasodilating activity.

The new compounds also possess antihistaminic properties as demonstrated by their antagonistic action on the histamine produced spasmus of the guinea pig ileum. They also inhibit the histaminic bronchospasms of the guinea pig when injected intravaneously at a dose of 0.1–0.2 mg./kg.

Studies on the central nervous system show that the new compounds of the invention decrease the spontaneous motor-activity in mice, produce hypotonia and ataxia and inhibit the conditioned reflex of sound-avoiding.

Their toxicity is low. Doses of 100 to 400 mg./kg. I.P. and 1000 to 2000 mg./kg. P.O. do not produce any mortality in mice, and the $LD_{100}$ varies from 200 to 800 mg./kg. I.P. and from 2000 to 3000 mg./kg. P.O.

The new compounds may be used as medicaments in the form of pharmaceutical preparations which contain the compounds in admixture or conjunction with a pharmaceutically suitable carrier such, for example, as an organic or inorganic solid or liquid carrier suitable for oral, or parenteral administration.

For making up the preparations there may be employed substances which do not react with the new compounds such, for example, as water, lactose, talc, starches, magnesium stearate, ethylcellulose or other known carriers.

The pharmaceuticals preparations may be in solid form, as for example, tablets, dragees, capsules or suppositories, or in liquid form as solutions, suspensions or emulsions.

The drugs may be used, for example in the treatment of hypertension, peripheral circulatory problems and bronchial asthma, and the doses employed can vary from 10 to 100 mg.

The following examples are given to illustrate the invention, but are not to be construed as limiting. The melting points were determined under the microscope on a Kofler heating bench.

EXAMPLE 1

1-[2'-(3'',4''-dihydroxyphenyl)-2'-hydroxyethyl]-4-(o-methoxyphenyl) piperazine

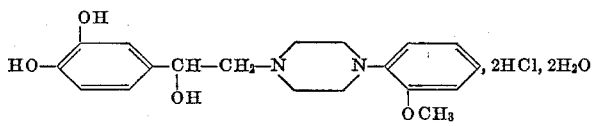

110 g. of 1-(3',4'-dihydroxyphenacyl)-4-(o-methoxyphenyl) piperazine, melting at 107–108° C., are dissolved in 575 cm.³ of normal caustic soda. The dark brown alkaline solution obtained is put into a pressure bottle together with 110 g. of Raney nickel and the suspension is shaken at a hydrogen pressure of between 3 and 7 atmospheres, at normal temperature. At the end of 130 minutes, 99% of the theoretical amount of hydrogen has been absorbed. The catalyst is filtered off and rinsed with 3× 100 cm.³ of water. The filtrate is stirred and a strong stream of carbon dioxide bubbled through it for 45 minutes. The base precipitates. It is filtered off, rinsed with water, and washed with 2× 250 cm.³ of methanol, which removes a coloured impurity. On drying, 80.5 g. of a powdery product of deep rose colour is obtained.

The crude product is suspended in 300 cm³ of anhydrous methanol. The suspension is heated to 40° C. and 120 cm.³ of a saturated solution of dry hydrogen chloride in ether is added. On cooling rapidly, the dihydrochloride of 1-[2'-1(3'',4''-dihydoxyphenyl) - 2' - hydroxyethyl]-4-(o-methoxyphenyl) piperazine crystallises out. 60 g. of rosy-white crystals, melting at 120–125° C. (with decomposition), are obtained.

The corresponding base, which melts at 179–180° C. (with decomposition), is obtained by dissolving this dihydrochloride in water and adding sodium carbonate.

The starting ketone is prepared by condensing 1 molecule of dihydroxyphenacyl chloride with 2 molecules of (o-methoxyphenyl) piperazine, in 70% ethanol.

EXAMPLE 2

1-[2'-(3'',4''-dihydroxyphenyl)-2'-hydroxyethyl]-4-(p-tolyl) piperazine

This compound was prepared as in Example 1, from 19 g. of 1-(3',4'-dihydroxyphenacyl)-4-(p-tolyl) piperazine melting at 190–192° C. 18 g. of dihydrochloride of 1 - [2' - (3'',4'' - dihydroxyphenyl) - 2' - hydroxyethyl]-4-(p-tolyl) piperazine are obtained, melting at 141–143° C. (with decomposition). The corresponding base melts at 162–164° C.

EXAMPLE 3

1-[2'-(3'',4''-dihydroxyphenyl)-2'-hydroxyethyl]-4-(m-tolyl) piperazine

This compound was prepared as in Example 1, from 25 g. of 1-(3',4'-dihydroxyphenacyl)-4-(m-tolyl) piperazine melting at 178–179° C. 18.5 g. of dihydrochloride of 1-[2' - (3'',4'' - dihydroxyphenyl) - 2' - hydroxyethyl]-4-(m-tolyl) piperazine are obtained, melting at 113–117° C. (with decomposition) (crystallised with one molecule of water). The corresponding base melts at 92–95° C.

EXAMPLE 4

1-[2'-(3'',4''-dihydroxyphenyl)-2'-hydroxyethyl]-4-(o-tolyl) piperazine

This compound was prepared as in Example 1, from 20 g. of 1-(3',4'-dihydroxyphenacyl)-4-(o-tolyl) piperazine melting at 192–193° C. 16.4 g. of dihydrochloride of 1 - [2' - (3'',4'' - dihydroxyphenyl) - 2' - hydroxyethyl]-4-(o-tolyl) piperazine are obtained, melting at 126–133° C. (with decomposition) (crystallised with one molecule of water). The corresponding base melts at 185–186° C.

EXAMPLE 5

1-[2'-(3'',4''-dihydroxyphenyl)-2'-hydroxyethyl]-4-(m-methoxyphenyl) piperazine

This compound was prepared as in Example 1, from 20 g. of 1-(3',4'-dihydroxyphenacyl)-4-(m-methoxyphenyl) piperazine melting at 171–173° C. 17.1 g. of dihydrochloride of 1 - [2' - (3'',4'' - dihydroxyphenyl) - 2'-hydroxyethyl] - 4 - (m-methoxyphenyl) piperazine are obtained melting at 128–132° C. (with decomposition). The corresponding base melts at 149–150° C.

EXAMPLE 6

1-[2'-(3'',4''-dihydroxyphenyl)-2'-hydroxyethyl]-4-(p-methoxyphenyl) piperazine

This compound was pnepared as in Example 1, from 30 g. of 1-(3',4'-dihydroxyphenacyl)-4-(p-methoxyphenyl)

piperazine melting at 179–181° C. 27.5 g. of dihydrochloride of 1-[2′-(3″,4″-dihydroxyphenyl)-2′-hydroxyethyl] - 4 - (p-methoxyphenyl) piperazine are obtained melting at 171–174° C. (with decomposition). The corresponding base melts at 180–181° C.

EXAMPLE 7

1-[2′-(3″,4″-dihydroxyphenyl)-2′-hydroxyethyl]-4-phenyl piperazine

This compound was prepared as in Example 1, from 20 g. of 1-(3′,4′-dihydroxyphenacyl)-4-phenyl piperazine melting at 181–182° C. 17.5 g. of dihydrochloride of 1-[2′ - (3″,4″ - dihyroxyphenyl)-2′-hydroxyethyl]-4-phenyl piperazine are obtained melting at 132–137° C. (with decomposition). The corresponding base melts at 157–159° C.

EXAMPLE 8

1-[2′-(3″,4″-dihyroxyphenyl)-2′-hydroxyethyl]-4-(o-ethoxyphenyl) piperazine

This compound was prepared as in Example 1, from 11 g. of dihydrochloride of 1-(3′,4′-dihydroxyphenacyl)-4-(o-ethoxyphenyl)piperazine, melting at 208–210° C. 6.5 g. of dihydrochloride of 1′-[2′-(3″,4″-dihydroxyphenyl)-2′-hydroxyethyl]-4-(o-ethoxyphenyl) piperazine are obtained melting at 113–115° C. (with decomposition) (hemihydrate). The corresponding base melts at 157–158° C.

EXAMPLE 9

1-[2′-(3″,4″-dihydroxyphenyl)-2′-hydroxyethyl]-4-(m-dimethylsulfamidophenyl) piperazine This compound was prepared as in Example 1, from 7.2 g. of dihydrochloride of 1-(3′,4′-dihydroxyphenacyl)-4-(m-dimethylsulfamidophenyl) piperazine, melting at 215–219° C. 2 g. of dihyrochloride of 1-[2′-(3″,4″-dihydroxphenyl) - 2′ - hydroxyethyl] - 4 - (m-dimethylsulfamidophenyl) piperazine are obtained melting at 120–123° C. (with decomposition). The corresponding base ments at 102–105° C.

EXAMPLE 10

1-[2′-(3″,4″-dehydroxyphenyl)-2′-hydroxyethyl]-4-piperonyl piperazine

This compound was prepared as in Example 1, from 19 g. of 1-(3′,4′-dihydroxyphenacyl)-4-piperonyl piperazine melting at 104–106° C. 14 g. of dihydrochloride of 1 - [2′ - (3″,4″ - dihyroxyphenyl)-2′-hydroxyethyl]-4-piperonyl piperazine are obtained melting at 165–167° C. (with decomposition) (hemihydrate). The corresponding base melts at 150–153° C.

EXAMPLE 11

1-[2′-(3″,4″-dihydroxyphenyl)-2′-hydroxyethyl]-4-methyl piperazine

This compound was prepared as in Example 1, from 9.95 g. of dihydrochloride of 1-(3′,4′-dihydroxyphenacyl)-4-methyl piperazine melting at 210° C. (with decomposition). 2.8 g. of dihydrochloride of 1-[2′-(3″,4″-dihydroxyphenyl)-2′-hydroxyethyl]-4-methyl piperazine are obtained, melting at 213° C. (with decomposition) (crystallised with 2 molecules of water.

EXAMPLE 12

1-[2′-(3″,4″-dihyroxyphenyl)-2′-hydroxyethyl]-4-phenethyl piperazine

This compound was prepared as in Example 1, from 24 g. of dihydrochloride of 1-(3′,4′-dihydroxyphenacyl)-4-phenethyl piperazine melting at 207–210° C. 6.8 g. of dihydrochloride of 1-[2′-(3″,4″-dihydroxyphenyl)-2′-hydroxyethyl]-4-phenethyl piperazine are obtained melting at 179–180° C. (with decomposition).

EXAMPLE 13

1-[2′-(3″,4″-dihydroxyphenyl)-2′-hydroxyethyl]-4-phenylisopropyl piperazine

This compound was prepared as in Example 1, from 14 g. of 1-(3′,4′-dihydroxyphenacyl)-4-phenylisopropyl piperazine melting at 85–90° C. (with decomposition). 4.5 g. of dihydrochloride of 1-[2′(3″,4″-dihydroxyphenyl) - 2′ - hydroxyethyl]-4-phenylisopropyl piperazine are obtained melting at 167–171° C. (with decomposition The corresponding base melts at 164–165° C.

EXAMPLE 14

1-[2′-(3″,4″-dihydroxyphenyl)-2′-hydroxyethyl]-4-(γ,γ-diphenylpropyl) piperazine This compound was prepared as in Example 1, from 20 g. of dihydrochloride of 1-(3′,4′-dihydroxyphenacyl)-4-(γ,γ-diphenylpropyl) piperazine melting at 167–172° C. (with decomposition). 5.2 g. of fumarate of 1-[2′-(3″,4″-dihydroxyphenyl)-2′-hydroxyethyl]-4-(γ,γ-diphenyl propyl) piperazine are obtained melting at 155–157° C. The corresponding base melts as 101–103° C. and crystallised with one molecule of water.

EXAMPLE 15

Bis-1,4-[2′-(3″,4″-dihydroxyphenyl)-2′-hydroxyethyl]-piperazine

This compound was prepared as in Example 1, from 27 g. of carbonate of bis-1,4-(3′,4′-dihydroxyphenayl) piperazine melting at 223–226° C. 11.6 g. of dihydrochloride of bis 1,4 - [2′-(3″,4″-dihydroxyphenyl)-2′-hydroxyethyl]piperazine are obtained melting at 187–189° C. (with decomposition).

EXAMPLE 16

1-[2′-(3″,4″-dihydroxyphenyl)-2′-hydroxyethyl]-4-(m-trifluoromethylphenyl) piperazine This compound was prepared as in Example 1, from 36 g. of 1-(3′,4′-dihydroxyphenacyl)-4-(m-trifluoromethylphenyl) piperazine melting at 200° C. 8.7 g. of methane sulphonate are obtained melting at 143–146° C.

What we claim is:
1. A compound selected from the group consisting of (A) new piperazino-phenylethanol compounds of the general Formula I

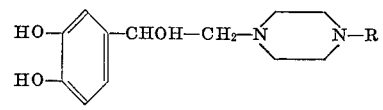

I wherein R is selected from the group consisting of:
lower-alkyl having up to 5 carbon atoms inclusive,
phenyl, lower-alkylphenyl wherein lower-alkyl has up to 5 carbon atoms inclusive, lower-alkoxyphenyl wherein lower-alkoxy has up to 5 carbon atoms inclusive, trifluoromethylphenyl, and dimethylsulfamidophenyl,
an aryl alkane group of the general Formula II

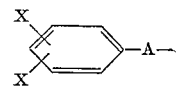

II in which X and Y are identical and each is a member selected from the group consisting of hydrogen and hydroxy, and a further member wherein X and Y together represent a methylenedioxy group, and A represents a group selected from an alkylene chain having 1 to 5 carbon atoms inclusive, and an alkylene chain having 1 to 5 carbon atoms inclusive and containing a secondary alcohol function —CHOH—, said alkylene chain containing at least 2 carbon atoms in the event both X and Y stand for a hydrogen atom, a diaryl alkane group of the general Formula III

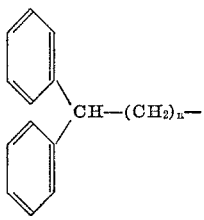

in which $n$ is 0 to 3, inclusive, and (B) therapeutically acceptable acid addition salts thereof.

2. A compound of claim 1 which is 1-[2'-(3'',4''-dihydroxyphenyl) - 2' - hydroxyethyl]-4-(o-methoxyphenyl) piperazine 3. A compound of claim 1 which is 1-[2'-(3'',4''-dihydroxyphenyl) - 2' - hydroxyethyl] - 4 - (p-tolyl) piperazine 4. A compound of claim 1 which is 1-[2'-(3'',4''-dihydroxyphenyl) - 2' - hydroxyethyl] - 4 - (m-tolyl) piperazine 5. A compound of claim 1 which is 1-[2'-(3'',4'', dihydroxyphenyl) - 2' - hydroxyethyl] - 4 - (o-tolyl) piperazine 6. A compound of claim 1 which is 1-[2'-(3'',4''-dihydroxyphenyl) - 2' - hydroxyethyl] - 4 - (m-methoxyphenyl) piperazine 7. A compound of claim 1 which is 1-[2'-(3'',4''-dihydroxyphenyl) - 2' - hydroxyethyl] - 4 - (p-methoxyphenyl) piperazine 8. A compound of claim 1 which is 1-[2'-(3'',4''-dihydroxyphenyl) - 2' - hydroxyethyl] - 4 - phenyl piperazine 9. A compound of claim 1 which is 1-[2'-(3'',4''-dihydroxyphenyl) - 2' - hydroxyethyl]-4-(o-ethoxyphenyl) piperazine 10. A compound of claim 1 which is 1-[2'-(3'',4''-dihydroxyphenyl) - 2' - hydroxyethyl] - 4 - (m-dimethylsulfamidophenyl) piperazine 11. A compound of claim 1 which is 1-[2'-(3'',4''-dihydroxyphenyl) - 2' - hydroxyethyl] - 4 - methyl piperonyl piperazine 12. A compound of claim 1 which is 1-[2'-(3'',4''-dihydroxyphenyl) - 2' - hydroxyethyl] - 4 - methyl piperazine 13. A compound of claim 1 which is 1-[2'(3'',4''-dihydroxyphenyl) - 2' - hydroxyethyl] - 4 - phenethyl piperazine 14. A compound of claim 1 which is 1-[2'-(3'',4''-dihydroxyphenyl) - 2' - hydroxyethyl] - 4 - phenylisopropyl piperazine 15. A compound of claim 1 which is 1-[2'-(3'',4''-dihydroxyphenyl) - 2' - hydroxyethyl] - 4 - (γ,γ-diphenylpropyl) piperazine 16. A compound of claim 1 which is Bis-1,4-[2'-(3'', 4''-dihydroxyphenyl)-2'-hydroxyethyl] piperazine 17. A compound of claim 1 which is 1-[2'-(3'',4''-dihydroxyphenyl) - 2' - hydroxyethyl] - 4 - (m-trifluoromethylphenyl) piperazine

References Cited

UNITED STATES PATENTS 2,927,924   3/1960   Mills _____ 260—268

OTHER REFERENCES

Wagner et al., Synthetic Organic Chemistry, John Wiley and Sons, Inc., New York, 1953, pp. 149–152 relied on.

Schioter: Newer Methods of Preparative Organic Chemistry, Interscience Publishers, Inc., New York, 1948, pp. 83–85 relied on.

NICHOLAS S. RIZZO, Primary Examiner

T. TIGHE, Assistant Examiner

U.S. Cl. X.R.

424—250

UNITED STATES PATENT OFFICE
CERTIFICATE OF CORRECTION

Patent No. 3,505,334  Dated April 7, 1970

Inventor(s) Gilbert Regnier et al.

It is certified that error appears in the above-identified patent and that said Letters Patent are hereby corrected as shown below:

| | | |
|---|---|---|
| Column 3, line 44<br>Appl. Page 4, line 2 | "oral, or" should read<br>--- oral, rectal or --- | |
| Column 4, line 74<br>Appl. Page 6, line 1 | "prepard" should read<br>--- prepared --- | |
| Column 5, line 41<br>Appl. Page 6, line 27 | "base ments" should read<br>--- base melts --- | |
| Column 6, line 10<br>Appl. Page 7, line 18 | "(with decomposition" should read<br>--- (with decomposition). --- | |
| Column 6, line 22<br>Appl. Page 7, line 26 | "melts as " should read<br>--- melts at --- | |
| Column 6, line 30<br>Appl. Page 8, line 1 | "from 27 g" should read<br>--- from 17 g --- | |
| Column 6, line 30<br>Application Page 8, line 2 | "-dihydroxyphenayl)" should read<br>--- -dihydroxyphenacyl) --- | |

Column 6, Claim 1, Line 66
General Formula II
Appl. Page 9, line 11

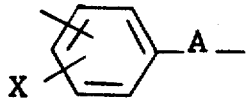    should read    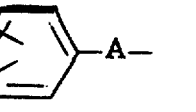

Column 8, Claim 11, line 5
Appl. Page 10, line 14    "4-methyl piperonyl" should read
--- 4-piperonyl---

Signed and sealed this 1st day of December 1970.

(SEAL)
Attest:

Edward M. Fletcher, Jr.
Attesting Officer

WILLIAM E. SCHUYLER, JR.
Commissioner of Patents